United States Patent
Bräutigam (10) Patent No.: US 10,557,488 B2
(45) Date of Patent: Feb. 11, 2020

(54) SPACER NUT (71) Applicant: ILLINOIS TOOL WORKS INC., Glenview, IL (US)

(72) Inventor: Martina Bräutigam, Weikersheim (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 258 days.

(21) Appl. No.: 15/542,310

(22) PCT Filed: Aug. 12, 2015

(86) PCT No.: PCT/US2015/044859
§ 371 (c)(1),
(2) Date: Jul. 7, 2017

(87) PCT Pub. No.: WO2016/126284
PCT Pub. Date: Aug. 11, 2016

(65) Prior Publication Data
US 2018/0172043 A1 Jun. 21, 2018

(30) Foreign Application Priority Data

Feb. 2, 2015 (DE) .......................... 10 2015 101 444
Mar. 10, 2015 (DE) .......................... 10 2015 103 491

(51) Int. Cl.
F16B 43/02 (2006.01)
F16B 5/02 (2006.01)
F16B 37/00 (2006.01)

(52) U.S. Cl.
CPC ............ *F16B 5/0233* (2013.01); *F16B 37/00* (2013.01)

(58) Field of Classification Search
CPC ................................ F16B 37/04; F16B 37/041
(Continued)

(56) References Cited

U.S. PATENT DOCUMENTS 8,202,033 B2 * 6/2012 Choi .................... B62D 25/147
411/535
9,302,716 B2 * 4/2016 Sahi ..................... B62D 27/065
(Continued)

FOREIGN PATENT DOCUMENTS

DE 3620005 9/1987
DE 102018201496 A1 8/2019
(Continued)

OTHER PUBLICATIONS

PCT, International Search Report and Written Opinion, International Application No. PCT/US2015/044859; dated Oct. 16, 2015, 10 pages.

*Primary Examiner* — Gary W Estremsky
(74) *Attorney, Agent, or Firm* — Thompson Hine LLP (57) ABSTRACT

Spacer nut for connecting spaced-apart fastening portions of two components, having a threaded part forming an internal thread for a screw, having an intermediate piece forming a thread and a through-passage opening, wherein the threaded part and the intermediate piece can be, or are, connected to one another such that an accommodating space for the fastening portion of a first component is formed between them and the internal thread and the through-passage opening in the intermediate piece are arranged in alignment, and having a spacer piece with a thread, which can be screwed together with the thread of the intermediate piece, a through-passage opening, which is in alignment with the internal thread, and a contact surface, which incorporates the one end of the through-passage opening of the spacer piece and is provided for abutment against the fastening portion of the second component.

20 Claims, 5 Drawing Sheets

(58) Field of Classification Search
USPC .......................................... 411/340, 174, 384
See application file for complete search history.

(56) References Cited

U.S. PATENT DOCUMENTS

| | | | |
|---|---|---|---|
| 2006/0226312 A1* | 10/2006 | Masuch | F16B 5/0233 |
| | | | 248/188 |
| 2007/0243038 A1 | 10/2007 | Rausch et al. | |
| 2017/0138388 A1* | 5/2017 | Figge | F16B 37/041 |

FOREIGN PATENT DOCUMENTS

| | | |
|---|---|---|
| EP | 1970574 | 9/2008 |
| WO | WO 2014/107388 A1 | 7/2014 |
| WO | WO 2014/120707 A1 | 8/2014 |

* cited by examiner

SPACER NUT

The invention relates to a spacer nut for connecting spaced-apart fastening portions of two components.

Spacer nuts of said type are known for example from WO 2014/120707 A1 or from WO 2014/107388 A1. Said spacer nuts serve for connecting two components, which are spaced apart from one another at least in the region of the fastening portions, to one another, wherein said spacing between the fastening portions may be variable within limits, and it is the intention for this to be compensated by way of the spacer nuts.

The invention was based on the object of improving a spacer nut of said type such that it is as easy as possible to handle and/or produce.

Said object is achieved by means of a spacer nut as per patent claim 1. Advantageous refinements of the spacer nut according to the invention are claimed in the further patent claims and will emerge from the following description of the invention.

A spacer nut according to the invention for connecting spaced-apart fastening portions of two components comprises at least
- a threaded part forming an internal thread for a screw,
- an intermediate piece forming a thread and a through-passage opening (the thread preferably being formed as an internal thread in the through-passage opening), wherein
  the threaded part and the intermediate piece can be, or are, connected to one another such that
    an accommodating space for the fastening portion of a first of the components is formed between them and
    the internal thread of the threaded part and the through-passage opening (or the internal thread) in the intermediate piece are arranged in alignment and preferably as coaxially as possible,
- and a spacer piece with
  a thread, preferably external thread, which can be screwed into the (internal) thread of the intermediate piece,
  a through-passage opening, which is in alignment with, and, in particular, is as coaxial as possible to, the internal thread of the threaded part (and, if appropriate, also of the intermediate piece), and
  a contact surface, which incorporates the one end of the through-passage opening and is provided for abutment against the fastening portion of the second of the components.

According to the invention, "alignment" is to be understood to mean that the (threaded) openings at least partially overlap (but may be spaced apart).

By means of the refinement according to the invention, a spacer nut of said type is easy to handle, which arises in particular from the fact that, by virtue of the fastening portion of the first component being positioned within the accommodating space, said spacer nut can be securely held by said fastening portion. In a first step in the use of a spacer nut according to the invention, it is thus possible for said spacer nut to be mounted onto the fastening portion of the first component, whereupon then, the spacer nut can be adjusted to the intended spacing between the fastening portions of the two components by virtue of the spacer piece being screwed into or out of the intermediate piece. Since, here, it is no longer necessary for the spacer nut as a whole to be secured in position, this yields good handlability.

In a preferred refinement of the spacer nut according to the invention, it may be provided that the through-passage opening in the spacer piece, in at least a clamping portion, has its (opening) cross section dimensioned such that a screw, which can be screwed into the internal thread of the threaded part, would carry along the spacer piece with clamping action during such a screwing-in operation.

Here, "carry along with clamping action" is to be understood to mean that the friction between the screw and the corresponding portion of the through-passage opening in the spacer piece is so great that a rotation of the screw leads to the spacer piece being carried along, wherein the friction in the threaded connection between the spacer piece and the intermediate piece is overcome. At the same time, the friction between the screw and the corresponding portion of the through-passage opening in the spacer piece is so low that it is overcome when the spacer piece is rotated against a stop and the screw is rotated onward with normal handling force.

Here, it may preferably be provided that at least one such clamping portion is formed by a clamping spring lug. Said clamping spring lug can be elastically deflected as a result of the insertion of the screw into the through-passage opening, whereby said clamping spring lug can, even in the case of relatively large tolerances with regard to the outer diameter of the screw, always generate a clamping force which lies in a defined range. It may particularly preferably be provided that at least the clamping portion (or the clamping spring lug that forms said clamping portion), and possibly also a portion which delimits the through-passage opening as a whole or at least in a further portion (aside from the clamping portion), is or are formed from a different material than a main body of the spacer piece. In this case, the material that forms at least the clamping portion may in particular have a lower modulus of elasticity, and thus also be softer, than the material of the main body, as in this way a clamping action on the screw can advantageously be generated. For example, it may be provided that the material provided for at least the clamping portion is an elastomer, in particular a thermoplastic elastomer. For the material of the main body, it is for example possible for a plastic that is harder than the elastomer, in particular a thermoplastic, to be provided. For advantageous production of a spacer piece of said type, use may be made in particular of a 2-component injection molding process.

Such a refinement of the spacer nut according to the invention permits an adjustment of the spacer nut, to the spacing formed between the fastening portions of the two components, by means of the screw, without the spacer piece having to be accessible for this purpose. Consequently, it is possible for the two components to initially be positioned relative to one another in the intended position, and for the spacer nut to subsequently be adjusted to the spacing that is respectively actually present between the fastening portions.

For an unscrewing of the spacer piece for adaptation of the spacer nut to the spacing between the fastening portions, it is not necessary for the screw, which is provided for screwing into the threaded part of the spacer nut, to already be engaged into the internal thread of the threaded part at this point in time.

It should advantageously be provided that the internal thread of the threaded part and the (external) thread of the spacer piece are oriented (and in particular opposed) such that, when the screw is screwed in one direction of rotation, which corresponds to said screw being screwed into the internal thread of the threaded part, the spacer piece is unscrewed from the intermediate piece. In this way, it can be achieved that, for a screwing-in or unscrewing of the spacer piece by means of the screw, the same direction of rotation of the screw is always provided regardless of whether or not said screw is engaged into the internal thread of the threaded part.

In a furthermore preferred refinement of the spacer nut according to the invention, it may be provided that the spacer piece has a threaded portion, which forms the (external) thread, and a head portion, which forms the contact surface, wherein the head portion has larger cross-sectional dimensions (and in particular a larger diameter in the case of an each case circular cross-sectional geometry (perpendicular to the longitudinal axis of the external thread or of the through-passage opening)) than the threaded portion. In this way, it is possible firstly to realize a relatively large contact surface for the fastening portion of the second component, whereby the stability of the connection between the two components can be improved. Second, an end stop for a screwing-in of the spacer piece into the intermediate piece can be formed in this way. An end stop of said type can improve the handlability of the spacer nut according to the invention.

It may furthermore preferably be provided that the threaded part and the intermediate piece are connected to one another by means of a clamp, which engages around the fastening portion of the first component and which is preferably elastically expandable. In this way, a unit can be formed which is easy to handle and which comprises the threaded part, the clamp and the intermediate piece. By means of the clamp which engages around the fastening portion, it is furthermore possible for the spacer nut, in use, to be easily pushed onto the connecting portion for the purposes of connecting the fastening portions of the two components. Elastic expandability can in this case ensure that the spacer nut can, even without the screw being screwed into it, be held captively (in particular in non-positively locking fashion) on the fastening portion of the first component, which in turn can improve the handlability of the spacer nut and the connection of the two components to one another.

Here, it may furthermore preferably be provided that the accommodating space, which is formed by the clamp, is designed to increase in height from an open introduction end in the direction of a closed clamp end. Here, the height direction corresponds to the expansion direction. This permits the use of spacer nuts according to the invention of the same type for different fastening portions of first components which differ in terms of thickness (dimension in the direction of the height of the accommodating space) within defined limits, wherein, for all of said different fastening portions, an adequately intense clamping action can be attained by means of the clamp.

To prevent different extents of expansion of the clamp from having an adverse effect on (preferably parallel) orientations of contact surfaces, which bound the accommodating space, of the threaded part and of the intermediate piece, it may advantageously be provided that the threaded part and/or the intermediate piece are/is connected to an associated clamping portion such that they/it can (in each case) be rotated relative to the corresponding clamping portion about an axis which is oriented transversely and in particular perpendicularly to the longitudinal axis of the corresponding (internal) thread (and preferably furthermore transversely and in particular perpendicularly to a longitudinal extent of the leg, which forms the respective clamping portion, of the clamp). The rotatability of the threaded part and/or of the intermediate piece relative to the associated clamping portion can thus compensate for non-parallelism of the contact surface that would arise as a result of an expansion of the clamp.

It may furthermore be provided that the rotatability can be achieved by the clamp and/or the threaded part and/or the intermediate piece being in particular elastically deformable. This is possible in particular because the expandability of the clamp and thus the rotatability, which compensates for this, of the threaded part and/or of the intermediate piece relative to the corresponding clamping portion may be provided only in a relatively small angle range.

The unit composed of threaded part, clamp (if present) and intermediate piece may preferably be of single-part design. This may be based in particular on simple producibility, can keep production costs low, and/or can eliminate cumbersome pre-assembly of the spacer nut.

In a further preferred refinement of the spacer nut according to the invention, provision may also be made of a thread-securing means, by way of which the situation in which the spacer piece is unscrewed from the intermediate piece, starting from at least one securing position, is prevented or at least requires increased handling force (in relation to a normal handling force). In this case, the securing position may in particular be arranged at the end and/or at the beginning of the unscrewing path of the spacer piece.

Through the provision of a securing position at the end of the unscrewing path, it is possible to avoid a situation in which the spacer piece is undesirably unscrewed all the way out of the intermediate piece, whereby in turn, the handling of the spacer nut according to the invention can be improved. Through the provision of a securing position at the start of the unscrewing path, it can be achieved that a spacer piece that has been screwed substantially all the way into the intermediate piece is not inadvertently unscrewed (slightly) out of the intermediate piece. In this way, it is possible to realize as small as possible a space requirement for the spacer nut according to the invention, which can have an advantageous effect in particular with regard to storage and transportation of such spacer nuts. It may particularly preferably be provided that, at the end of the unscrewing path, there is provided a securing position which prevents the spacer piece from being unscrewed further, whereas, at the start of the unscrewing path, there is provided a further securing position, in which further unscrewing requires increased handling force.

In a refinement of the spacer nut according to the invention which is advantageous in terms of construction, it may be provided that the thread-securing means comprises a stop element which abuts against one or more stops. In this case, the stop element may preferably, in at least a securing position, act as a detent element which can engage with detent action into a depression and which may in particular be in the form of an elastically deflectable detent lug. In this case, it may be provided that the detent element is formed by the intermediate piece, which can engage into one or more depressions of the spacer piece. It may however preferably be provided that the stop element is arranged on the spacer piece and the stop is arranged on the intermediate piece or on the threaded part, which can in particular ensure good producibility of the stop element and/or of the stops.

In a furthermore preferred refinement of the spacer nut, it may also be provided that the stop element and/or the stop is/are designed such that, for a release of the thread-securing means, (substantially only) said stop element and/or stop are/is deformed by an increased handling force. For this purpose, it may be provided in particular that the stop element and/or the stop is formed from a different, in particular softer, material than a main body of the corresponding component (in particular threaded part, intermediate piece and spacer piece), which incorporates the stop element or the stop, of the spacer nut. It may particularly preferably be provided that at least a stop (element) which is integrated into the spacer piece is formed from a different, softer, material than a main body of the spacer piece. In this case, the stop (element) may in particular be formed from the same material as the clamping portion. If appropriate, the clamping portion and the stop (element) may also be formed by the same sub-element of the spacer piece.

The refinement according to the invention of a spacer nut advantageously makes it possible for the threaded part, the intermediate piece, the clamp (if present) and/or the spacer piece to be formed from plastic and produced for example by injection molding. In this way, inexpensive producibility and a low weight of the spacer nut can be realized.

The invention also relates to a combination of a spacer nut according to the invention and a suitable screw (said suitability relating at least with regard to the external thread of said screw in relation to the internal thread of the threaded part).

The indefinite article ("a", "an"), in particular in the claims and in the above description generally explaining the claims, should be understood as such and not as numerals. Components accordingly specified thereby should thus be understood as being present at least once, it being possible for them to be present multiple times.

The invention will be discussed in more detail below on the basis of the exemplary embodiments illustrated in the drawings, in which.

The spacer nut illustrated in the drawings comprises a threaded part 1 and an intermediate piece 3 which is connected integrally to said threaded part via a clamp 2.

The threaded part 1 forms a planar contact surface 4 which is provided for abutment against a side of an areal fastening portion of a first component 5 which is intended to be connected by way of the spacer nut and a screw 8 (for example M5) to a fastening portion of a second component 12, which is spaced apart from the fastening portion of the first component 5. Furthermore, the threaded part 1 forms a through-passage opening with an internal thread 6 which is provided for receiving an external thread 7 of a screw 8 which interacts with the spacer nut. The longitudinal axis 9 of the through-passage opening and thus of the internal thread 7 is oriented approximately perpendicular to the contact surface 4 of the threaded part 1.

The intermediate piece 3 likewise forms a planar contact surface 10, which is arranged adjacent to the contact surface 4 of the threaded part 1. The contact surfaces 4, 10 of the intermediate piece 3 and of the threaded part 1, together with inner surfaces of the clamp 2, bound an accommodating space 11 for the fastening portion of the first component 5. At least in a situation in which the fastening portion of the first component 5 is not positioned within the accommodating space 11, the contact surfaces 4, 10 of the intermediate piece 3 and of the threaded part 1 are in an approximately parallel orientation.

Figure 1:
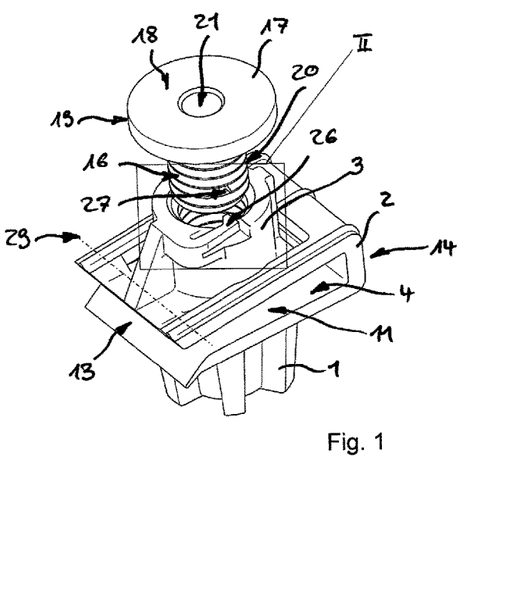
FIG. 1 shows a first embodiment of a spacer nut according to the invention in a first perspective view.

That leg of the clamp 2 which incorporates the intermediate piece 3 is connected to the intermediate piece 3 only in a portion adjoining an introduction end 13 of the accommodating space 11, whereas the intermediate piece 3 is otherwise surrounded by said leg of the clamp 2 in the manner of a frame. In this case, the inner surface of said portion of the leg which surrounds the intermediate piece 3 in the manner of a frame is oriented so as to be inclined relative to the contact surface 4 of the intermediate piece 3 (and thus also relative to the contact surfaces 4 of the threaded part 1 and of the fastening portion of the first component 5), whereby the height of the accommodating space increases from the introduction end 13 toward the closed clamp end 14 in the region in which said accommodating space is bounded by said frame-like portion of the leg. At the same time, the integral connection between the intermediate piece 3 and the associated leg of the clamp 2 is designed so as to be elastically twistable. This yields a rotatability of the intermediate piece 3 relative to the associated leg of the clamp 2 (clamping portion) about an axis of rotation 29 (cf. FIG. 1) which is perpendicular to the longitudinal axis 9 and perpendicular to a longitudinal extent of the corresponding leg of the clamp 2. A rotation of the intermediate piece 3 relative to said leg of the clamp 2 out of the unloaded basic position leads to the generation of an elastic restoring force. This configuration of the unit composed of threaded part 1, clamp 2 and intermediate piece 3 makes it possible for fastening portions of first component 5 of different thicknesses (for example 0.8 mm to 4 mm) to be inserted into the accommodating space 11, wherein the different thicknesses are compensated by elastic expansion of the clamp 2, and furthermore, an adequate clamping force is always generated on the respective fastening portion. At the same time, the rotatability of the intermediate piece 3 relative to the associated leg of the clamp 2, the inclined orientation of which is changed owing to expansion of the clamp 2, ensures that the contact surface 10 of the intermediate piece 3 always bears on the corresponding contact surface of the fastening portion of the respective first component 5 over as large an area as possible, and thus in particular always remains in a parallel orientation with respect to the contact surface of the threaded part 1.

Furthermore, a through-passage opening with an internal thread 15 is integrated into the intermediate piece 3, wherein the longitudinal axis 9 of said through-passage opening or of said internal thread 15 is likewise oriented approximately perpendicular to the contact surface 10 of the intermediate piece 10. Thus, the internal threads 15, 6 of the intermediate piece 3 and of the threaded part 1 are likewise oriented approximately coaxially in the unloaded basic position of the intermediate piece 3.

Figure 5:
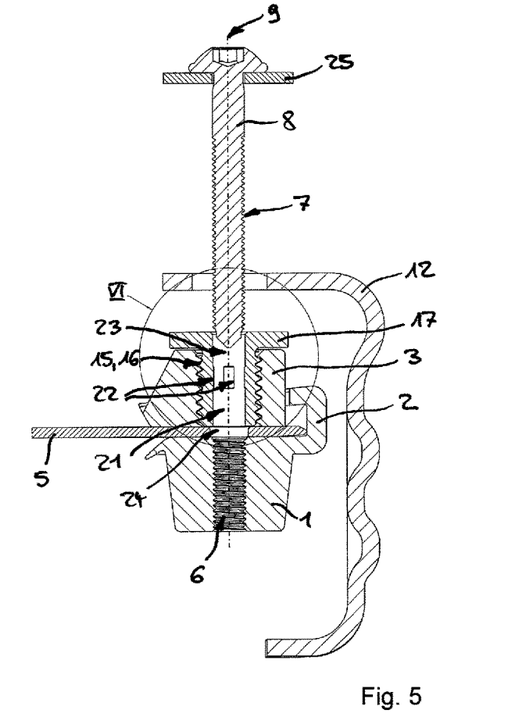
FIG. 5 shows a vertical section through the spacer nut as per FIGS. 1 to 4 with the spacer piece in an initial position, through a screw, suitable for said spacer nut, in a first position, and through the fastening portions of the two components to be connected by way of the spacer nut and the screw.
Figure 6:
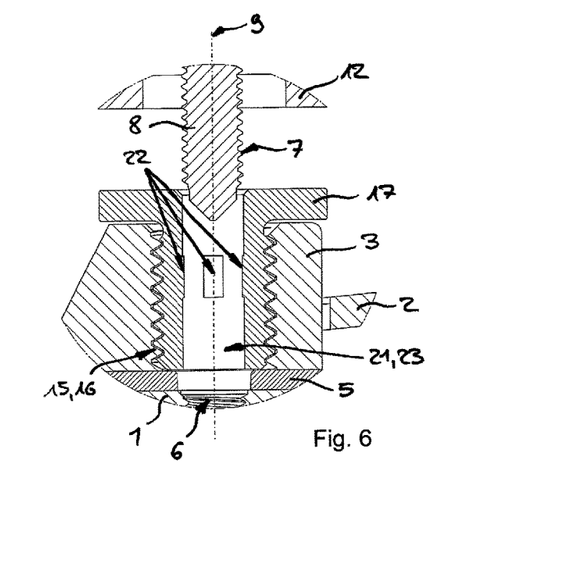
FIG. 6 shows the detail denoted in FIG. 5 by VI.

The internal thread 15 of the intermediate piece is engaged into by an external thread 16 of a spacer piece 17 of the spacer nut. Said spacer piece 17 firstly forms a contact surface 18 for the fastening portion of the second component 12, which contact surface is arranged on the distal side, in relation to the intermediate piece 3, of a head portion 19 of the spacer piece 17 and is oriented approximately parallel to the contact surfaces 10, 4 of the intermediate piece 3 and of the threaded part 1. The head portion 19 transitions in integral fashion into a threaded portion 20, which comprises the external thread 16, of the spacer piece 17. Furthermore, the spacer piece 17 forms a through-passage opening 21, the longitudinal axis 9 of which is oriented coaxially with respect to the longitudinal axes 9 of the internal threads 15, 6 of intermediate piece 3 and threaded part 1. A total of four clamping portions 22 are provided, so as to be distributed in a circumferential direction, within the through-passage opening 21 of the spacer piece 17, which clamping portions are formed as projections which protrude into the through-passage opening 21 radially with respect to a circumferential surface 23 of the through-passage opening 21 (cf. FIGS. 5 and 6). In this case, the diameter of the circumferential surface 23 of the through-passage opening 21 is slightly larger than the maximum outer diameter of the external thread 7 of the screw 8, whereas the diameter defined by the clamping portions 22 is slightly smaller than said maximum outer diameter of the external thread 7 of the screw 8. In this way, the spacer piece 17 can be connected in clamping fashion to the screw 8 which is inserted into the region of the clamping portions 22 of the through-passage opening 21, wherein the friction in said clamping connection is greater than the friction in the threaded connection between the intermediate piece 3 and the spacer piece 17. In this way, it is made possible for the spacer piece 17 to be unscrewed from the intermediate piece 3, and also screwed into the intermediate piece again, by means of the screw 8, which has an advantageous effect on the handling of the spacer nut during the connection of the two components 5, 12.

Figure 7:
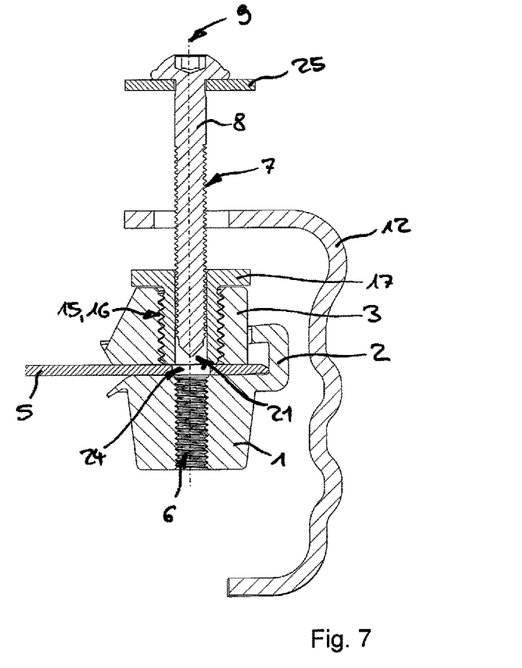
FIG. 7 shows a vertical section as per FIG. 5 with the screw in a second position.
Figure 8:
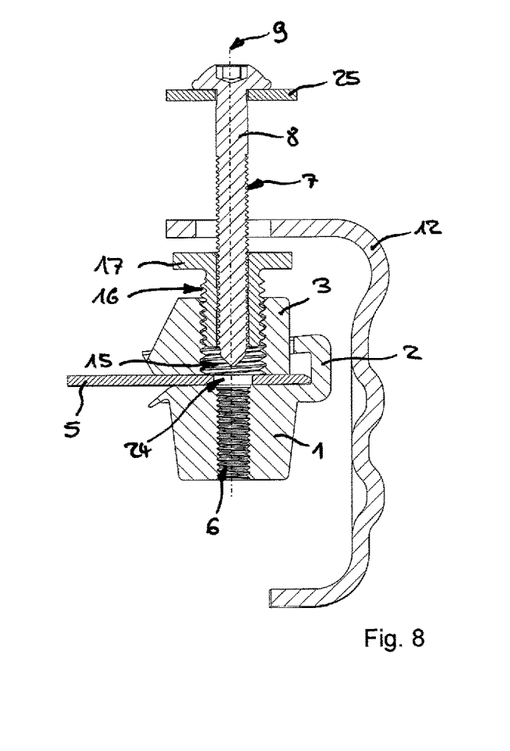
FIG. 8 shows a vertical section as per FIGS. 5 and 7 with the spacer piece in an intermediate position and with the screw in a third position.
Figure 9:
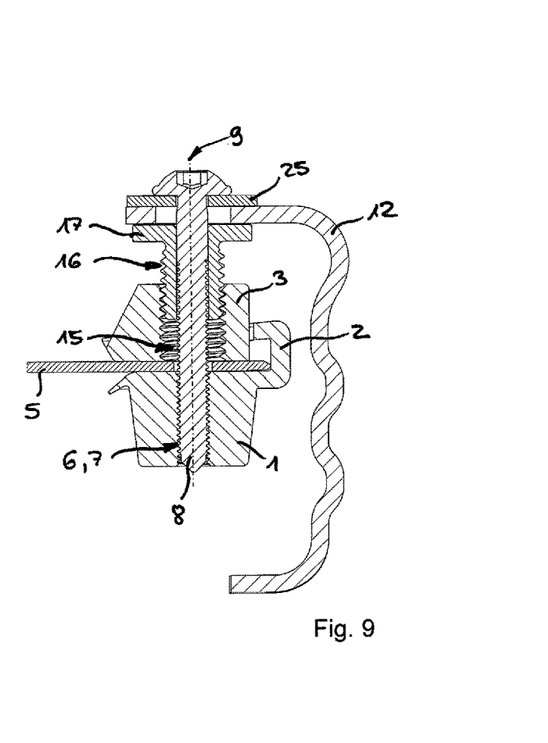
FIG. 9 shows a vertical section as per FIGS. 5, 7 and 8 with the spacer piece in an end position and with the screw in a fourth position.
Figure 10:
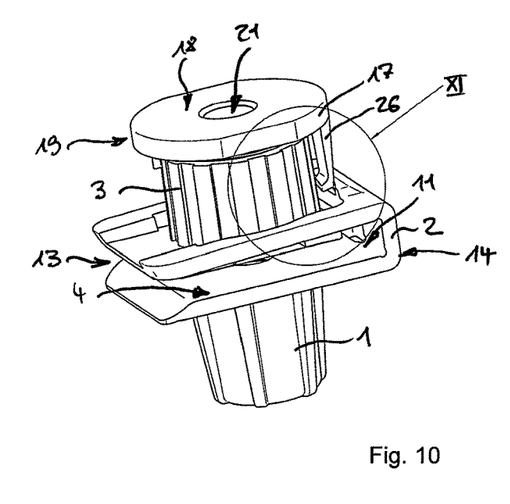
FIG. 10 shows a second embodiment of a spacer nut according to the invention with the spacer piece in an initial position.
Figure 11:
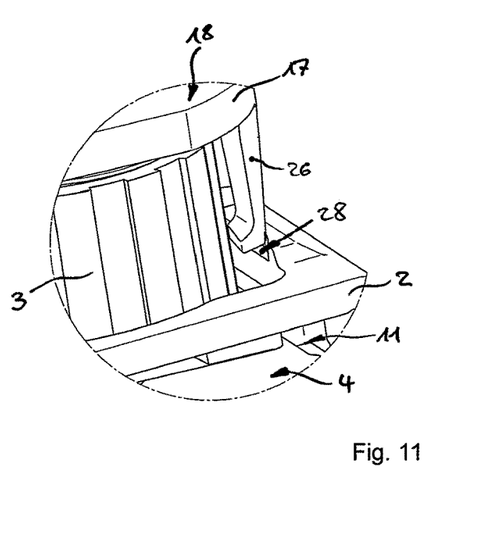
FIG. 11 shows the detail denoted in FIG. 10 by XI.
Figure 12:
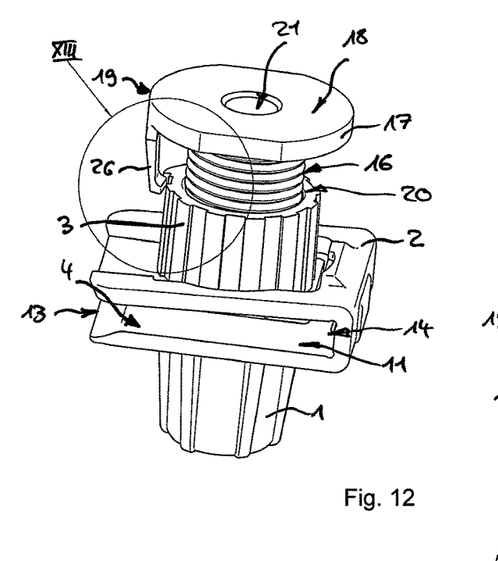
FIG. 12 shows the spacer nut as per FIGS. 10 and 11 with the spacer piece in an end position.
Figure 13:
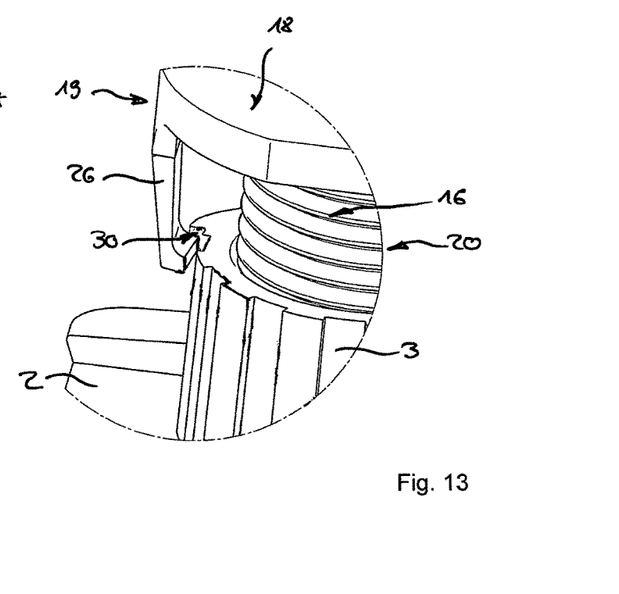
FIG. 13 shows the detail denoted in FIG. 12 by XIII.
Figures 14, 15, 16:
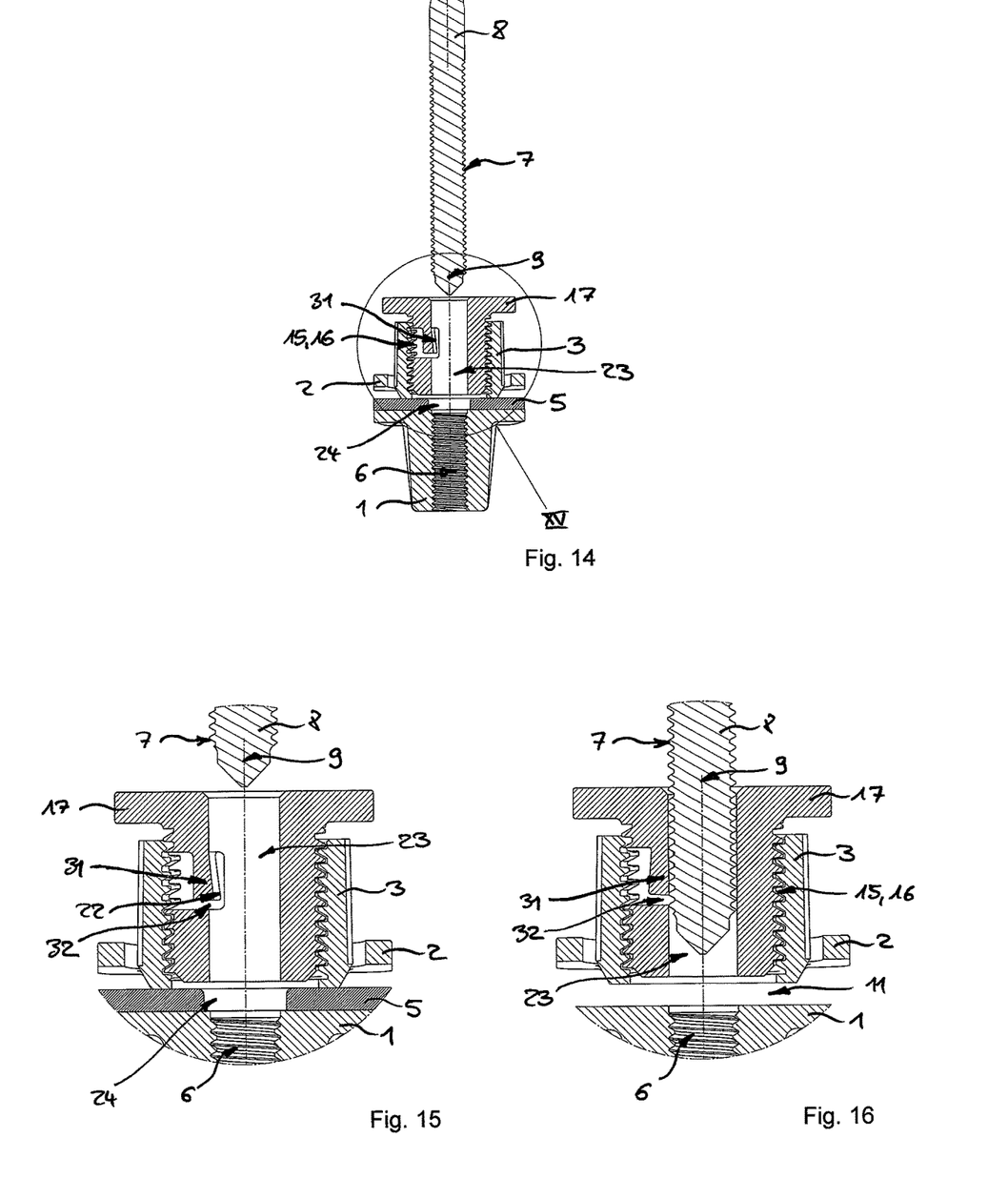
FIG. 14 shows a vertical section through the spacer nut as per FIGS. 10 to 13 with the spacer piece in the initial position and through a screw, suitable for said spacer piece, in a first position.
FIG. 15 shows the detail denoted in FIG. 14 by XV.
FIG. 16 shows the detail as per FIG. 15 with the screw in a second position.
Figure 17:
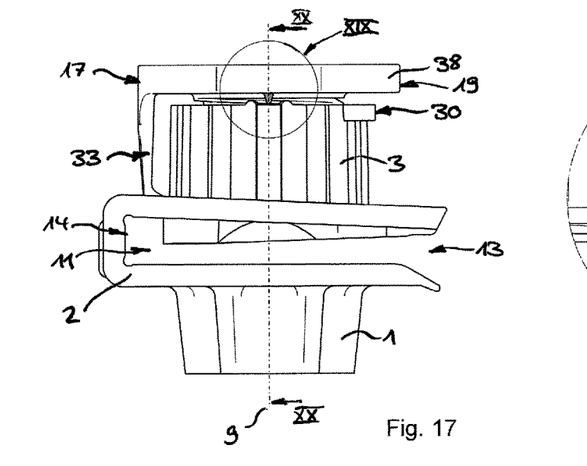
FIG. 17 shows a side view of a third embodiment of a spacer nut according to the invention with the spacer piece in an initial position.
Figure 18:
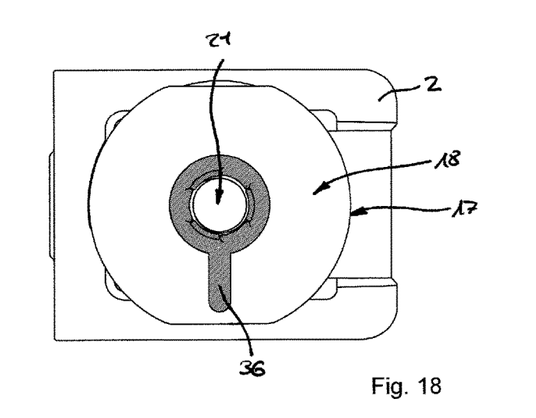
FIG. 18 shows the spacer nut as per FIG. 17 in a plan view.
Figure 19:
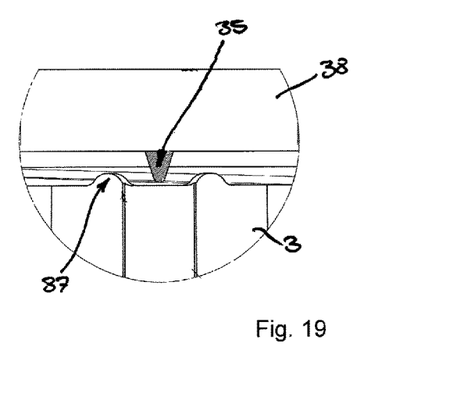
FIG. 19 shows the detail denoted in FIG. 17 by XIX.
Figure 20:
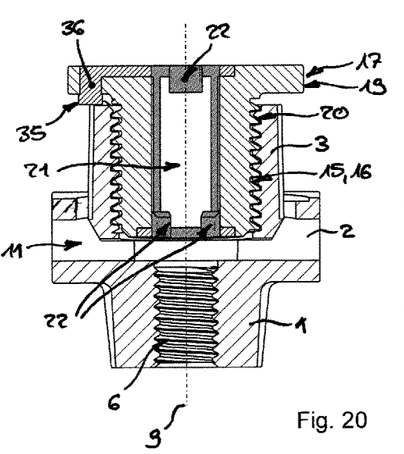
FIG. 20 shows a radial section through the spacer nut as per FIG. 17 along the section plane XX-XX.
Figure 21:
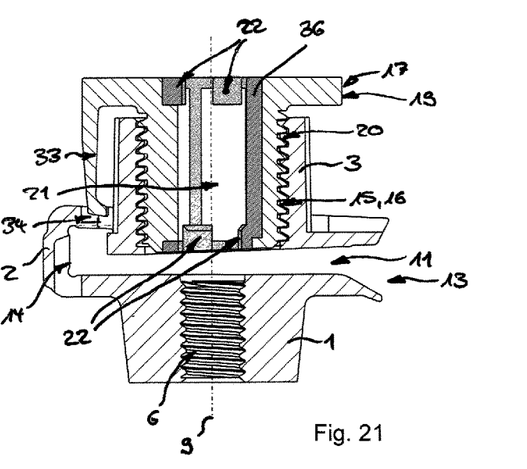
FIG. 21 shows a radial section through the spacer nut as per FIG. 17 along the section plane perpendicular to the section plane XX-XX.

Such a connection of the two components 5, 12 may be performed by virtue of the spacer nut, utilizing the accommodating space 11 formed by it, being pushed onto the fastening portion of the first component 5, wherein a through-passage opening 24 of the first component 5 is arranged in overlap with the through-passage opening 21 of the spacer piece 17 and with the internal thread 1 of the threaded part 1. In this case, the spacer piece 17 should be screwed into the intermediate piece 3 to such an extent that the spacing between the contact surface 10 of the intermediate piece 3 and the contact surface 18 of the spacer piece 17 is smaller than the spacing between the fastening portions of the two components 5, 12, which are already positioned in their final position relative to one another (cf. FIG. 5). Subsequently, the screw 8 is inserted into the through-passage opening 21 of the spacer piece 17 to such an extent that the described clamping connection is generated (cf. FIG. 7). In this case, the screw 8 may also be inserted to such an extent that its external thread 7 already begins to engage with the internal thread 6 of the threaded part 1. By rotation of the screw 8 clockwise, the spacer piece 17 is unscrewed from the intermediate piece 3 owing to the external thread 16 of the spacer piece 17 and internal thread 15 of the intermediate piece 3 being in the form of left-handed threads (cf. FIG. 8). Said unscrewing takes place until the contact surface 18 of the spacer piece 17 abuts against the corresponding contact surface of the fastening portion of the second component 12. The spacer piece 17 can thereby be unscrewed no further from the intermediate piece 3. The screw 8 is then pushed through the through-passage opening 21 of the spacer piece 17 to such an extent that its external thread 7 engages into the internal thread 6 of the threaded part 1, if this has not been done already. Subsequent clockwise rotation of the screw 8 ultimately leads to the screw 8 being screwed into the internal thread 6 of the threaded part 1, without the spacer piece 17 being unscrewed further from the intermediate piece 3. When the screw 8 has been screwed to the greatest possible extent into the internal thread 6 of the threaded part 1, the fastening portion of the second component 12 is fixed between the spacer piece 3 and a washer 25 of the screw 8, and is at the same time connected, with a fixed spacing, to the first component 5 (cf. FIG. 9).

Figure 2:
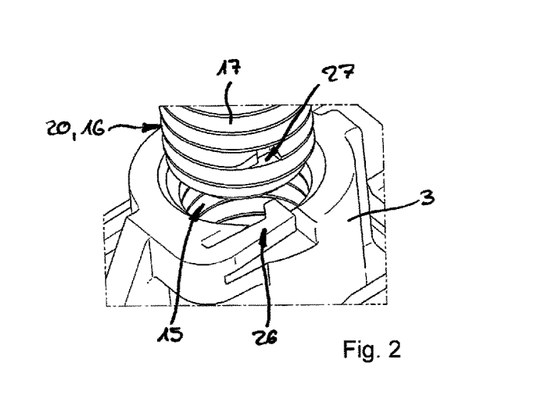
FIG. 2 shows the detail denoted in FIG. 1 by II.

The spacer nut also incorporates a twofold thread-securing means. Said thread-securing means comprises a detent lug 26 formed by the intermediate piece 3, and two detent depressions 27, 28 which are integrated into the threaded portion 20 of the spacer piece 17 and into which the detent lug 26 engages when the spacer piece 17 is screwed into the intermediate piece 3 to a corresponding screwing-in depth. In this case, one detent depression 27 is arranged in the vicinity of the free end of the threaded portion 20 of the spacer piece 17 (cf. FIGS. 1 and 2). Said detent depression serves as a captive retention means which prevents the spacer piece 17 from being able to be unscrewed all the way out of the intermediate piece 3, by virtue of the fact that a detent projection of the detent lug 26 engages into said detent depression 27 and abutment between the detent projection and a corresponding contact surface of the detent depression 27 prevents a further rotation of the spacer piece 17 in the corresponding direction of rotation. In this case, said abutment is configured such that the blocking action thereby effected cannot be eliminated without destruction of the detent lug 26. By contrast, in the opposite direction of rotation, the engagement of the detent projection into the detent depression 27 can, owing to an oblique orientation of the corresponding contact surfaces of the detent projection and of the detent depression 27, be overcome through the application of an increased handling force, wherein the detent lug 26 is elastically deflected.

Figure 3:
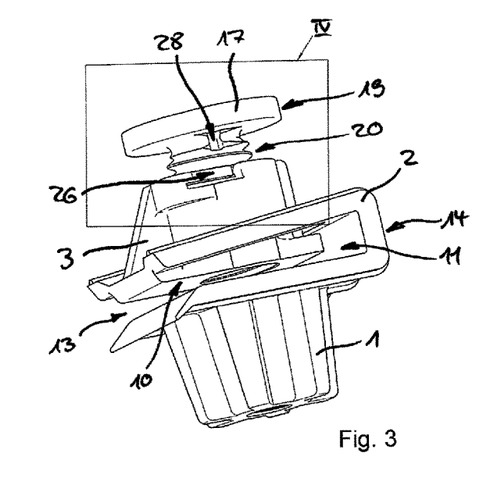
FIG. 3 shows the spacer nut in a second perspective view.
Figure 4:
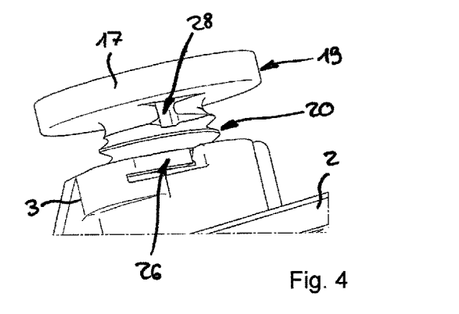
FIG. 4 shows the detail denoted in FIG. 3 by IV.

By contrast, the other detent depression 28 is arranged in the vicinity of the transition between the threaded portion 20 and the head portion 19 of the spacer piece 17 (cf. FIGS. 3 and 4). The thread-securing means formed by way of said detent depression 26 with the detent lug 26 is intended to ensure that the intermediate piece 3, when it is screwed substantially all the way into the spacer piece 17, remains in said position and does not inadvertently unscrew during storage and/or transportation of the spacer nut. In this way, an extremely small structural space requirement for the spacer nut during storage and transportation is ensured. It may be necessary for said thread-securing means to be released (through the application of an increased handling force) before the spacer piece 17 can be unscrewed from the intermediate piece 3 by way of the screw.

The second embodiment of a spacer nut according to the invention, as illustrated in FIGS. 10 to 16, differs from the first embodiment as per FIGS. 1 to 9 in the configuration of the thread-securing means and of the clamping portion 22.

In the case of the spacer nut as per FIGS. 10 to 16, the thread-securing means is formed by a detent lug 27 which is integrated (in unipartite fashion) into the head portion 19 of the spacer piece 17. Firstly, when the spacer piece 17 is in the position in which it has been screwed substantially all the way into the intermediate piece 3, the detent lug 26 engages into a detent depression 28 formed in the clamp 2 (cf. FIGS. 10 and 11), the intention of which is to realize a transport and storage securing means for the spacer piece 17. Unscrewing of the spacer piece 17 out of the intermediate piece 3 proceeding from said securing position is possible through the application of an increased handling force, wherein, owing to a correspondingly oblique design of the detent depression 28, the detent lug 26 is temporarily elastically deflected radially in the direction of the longitudinal axis 9 when moving out of said detent depression.

By contrast, when the spacer piece 17 is in a position in which it has been unscrewed substantially all the way out of the intermediate piece 3, the detent lug 26 abuts against a stop 30 arranged on the upper edge of the intermediate piece 3, so as to prevent the spacer piece 17 from being unscrewed all the way out of the intermediate piece 3, such that consequently, a captive retention means for the spacer piece 17 is realized. In said securing position, the detent lug 26 functions merely as a stop element, as no elastic deflection of the detent lug 26 is necessary in order to reach or depart from said securing position.

Instead of multiple clamping portions 22 formed on the inner side of the through-passage opening 21 of the spacer piece 17, as are provided in the case of the spacer nut as per FIGS. 1 to 9, the spacer nut as per FIGS. 10 to 16 has only one clamping portion 22, which is formed by a clamping spring lug 31. The clamping spring lug 31 extends into a circumferential opening 32 which is integrated into the threaded portion 20 of the spacer piece 17, and, in the unloaded state, said clamping spring lug extends obliquely (with respect to the longitudinal axis 9) into the through-passage opening 21 of the spacer piece 17 (cf. FIG. 15). When a screw 8 associated with the spacer nut is pushed or screwed into the through-passage opening 21 of the spacer piece 17, the clamping spring lug 31 is elastically deflected radially outward (in relation to the longitudinal axis 9), such that the elastic restoring forces effect the co-rotation of the spacer piece 17 with the screw 8 with clamping action, such as is required for the spacer piece 17 to be unscrewed from or screwed into the intermediate piece 3.

An advantage of the clamping spring lug 31 in the case of the spacer nut as per FIGS. 10 to 16 in comparison to the clamping portions 22 in the form of shoulders in the case of the spacer nut as per FIGS. 1 to 9 lies in the reliable generation of an adequately intense, and at the same time not excessively intense, clamping action for screws 8 to be used with the spacer nut, despite relatively large diameter tolerances.

The third embodiment of a spacer nut according to the invention, as illustrated in FIGS. 17 to 21, differs from the first embodiment as per FIGS. 1 to 9, and from the second embodiment as per FIGS. 10 to 16, in the configuration of the thread-securing means and of the clamping portion 22.

In the case of the spacer nut as per FIGS. 17 to 21, the thread-securing means is formed firstly by a stop lug 33 which is integrated (in unipartite fashion) into the head portion 19 of the spacer piece 17, which stop lug is similar to the detent lug 26 in the case of the spacer nut as per FIGS. 10 to 16. Firstly, when the spacer piece 17 is in the position in which it has been screwed substantially all the way into the intermediate piece 3, the stop lug 33 engages into a depression 34 formed in the clamp 2 (cf. FIG. 21). Said depression 34, on the side into which the stop lug 33 would move during the process of the spacer piece 17 being screwed in proceeding from said securing position, is in the form of a stop which prevents a screwing-in process of said type. By contrast, on the side into which the stop lug 33 would move during the process of the spacer piece 17 being unscrewed proceeding from said securing position, the depression 34 does not form a stop. Nevertheless, it is necessary for an increased handling force to be applied in order to unscrew the spacer piece 17 out of the intermediate piece 3 proceeding from said securing position. For this purpose, the spacer piece 17 forms a further stop element 35, which is composed of a highly elastic material, for example an elastomer, and which, in order for the spacer piece 17 to be unscrewed proceeding from said securing position, must be moved past a stop 37 formed on the intermediate piece 3, for which purpose the stop element 35 must be deformed.

In a (securing) position of the spacer piece 17, in which said spacer piece has been unscrewed substantially all the way out of the intermediate piece 3, the stop lug 33 abuts against a stop 30 arranged on the upper edge of the intermediate piece 3, so as to prevent the spacer piece 17 from being unscrewed all the way out of the intermediate piece 3, such that consequently, captive retention of the spacer piece 17 is realized in said securing position.

As in the case of the spacer nut as per FIGS. 1 to 9, the spacer piece 17 in the case of the spacer nut as per FIGS. 17 to 21 also comprises multiple clamping portions 22, which in this case are however arranged in the region of the two ends of the through-passage opening 21. In this case, multiple clamping portions 22 arranged with uniform pitch are provided both at one end and at the other end of the through-passage opening 21. The clamping portions 22 of one end are in this case furthermore arranged so as to be rotationally offset (about the longitudinal axis 9) by half a pitch in relation to the clamping portions 22 of the other end.

The clamping portions 22 are formed by a unipartite insert part 36, which also incorporates the stop element 35. Accordingly, the clamping portions 22 are also formed from a highly elastic material, in particular an elastomer. This permits reliable generation of an adequately intense, and at the same time not excessively intense, clamping action for screws 8 to be used with the spacer nut, despite relatively large diameter tolerances. The insert part 36 is accommodated (non-detachably) within a main body 38 of the spacer piece 17, wherein said main body 38 is formed from a material which is less elastic, and harder, than the material of the insert part 36, in particular from a thermoplastic material. The spacer piece 17 may preferably be produced by 2-component injection molding, which, despite the use of two different materials, permits inexpensive producibility. Connecting portions of the insert part 36, which connect the clamping portions 22 and the stop element 35 to one another, firstly ensure secure hold of the clamping portions 22 and of the stop element 35 in the main body 38, and furthermore permit a distribution of the material used for the insert part 36 during the course of the injection molding, despite the use of only one or relatively few injection points.

Pushing or screwing a screw 8 which is associated with the spacer nut into the through-passage opening 21 of the spacer piece 17 causes the clamping portions 22 to be elastically deformed radially outward (in relation to the longitudinal axis 9), such that the elastic restoring forces effect the co-rotation of the spacer piece 17 with the screw 8 with clamping action, such as is required for the spacer piece 17 to be unscrewed from or screwed into the intermediate piece 3.

LIST OF REFERENCE NUMERALS

1 Threaded part
2 Clamp
3 Intermediate piece
4 Contact surface of the threaded part
5 First component
6 Internal thread of the threaded part
7 External thread of the screw
8 Screw
9 Longitudinal axis
10 Contact surface of the intermediate piece
11 Accommodating space
12 Second component
13 Introduction end of the accommodating space
14 Clamp end of the accommodating space
15 Internal thread of the intermediate piece
16 External thread of the spacer piece
17 Spacer piece
18 Contact surface of the spacer piece
19 Head portion of the spacer piece
20 Threaded portion of the spacer piece
21 Through-passage opening of the spacer piece
22 Clamping portion
23 Circumferential surface of the through-passage opening
24 Through-passage opening of the first component
25 Washer
26 Detent lug
27 Detent depression
28 Detent depression
29 Axis of rotation
30 Stop
31 Clamping spring lug
32 Circumferential opening
33 Stop lug
34 Depression
35 Stop element
36 Insert part
37 Stop
38 Main body

The invention claimed is:

1. A spacer nut for connecting spaced-apart fastening portions of two components (5, 12),
having a threaded part (1) forming an internal thread (6) for a screw (8),
having an intermediate piece (3) forming a thread (15) and a through-passage opening, wherein:
the threaded part (1) and the intermediate piece (3) are connected to one another such that
an accommodating space (11) for the fastening portion of a first component (5) is formed between them and
the internal thread (6) and the through-passage opening in the intermediate piece (3) are arranged in alignment,
and having a spacer piece (17) with
a thread (16), which can be screwed together with the thread (15) of the intermediate piece (3),
a through-passage opening (21), which is in alignment with the internal thread (6), and
a contact surface (18), which incorporates the one end of the through-passage opening (21) of the spacer piece (17) and is provided for abutment against the fastening portion of the second component (12);
wherein the threaded part (1) and the intermediate piece (3) are connected to one another by a clamp (2), which is provided for engaging around the fastening portion of the first component (5), wherein the clamp includes a first clamp leg and a second clamp leg that are spaced apart to form the accommodating space (11), wherein the first clamp leg and the second clamp leg are interconnected by a closed clamp end (14);
wherein the accommodating space (11) has an open introduction end (13) with a first height, and the accommodating space (11) has at least one other portion, toward the closed clamp end (14), having a second height that is greater than the first height.

2. The spacer nut as claimed in claim 1, characterized in that the through-passage opening (21) of the spacer piece (17), in at least a clamping portion (22), has its cross section dimensioned such that a screw (8), which is provided for screwing into the internal thread (6) of the threaded part (1), would carry along the spacer piece (17) with clamping action during such a screwing-in operation.

3. The spacer nut as claimed in claim 1, characterized in that at least the clamping portion (22) is formed from a different material than a main body (38) of the spacer piece (17).

4. The spacer nut as claimed in claim 1, characterized in that the internal thread (6) of the threaded part (1) and the thread (16) of the spacer piece (17) are oriented such that, when the screw (8) is screwed into the internal thread (6) of the threaded part (1), the spacer piece (17) would be unscrewed from the intermediate piece (3).

5. The spacer nut as claimed in claim 1, characterized in that the spacer piece (17) has a threaded portion (20), which comprises the thread (16), and a head portion (19), which comprises the contact surface (18), wherein the head portion (19) has larger cross-sectional dimensions than the threaded portion (20).

6. The spacer nut as claimed in claim 1, wherein the intermediate piece is connected to the first clamp leg and the threaded part is connected to the second clamp leg, wherein the intermediate piece is rotatable relative to the first clamp leg about an axis which is oriented perpendicularly to a longitudinal axis of the through-passage opening of the intermediate piece.

7. The spacer nut as claimed in claim 1, characterized by a thread-securing means, by way of which the situation where the spacer piece (17) is unscrewed from the intermediate piece (3), starting from at least one securing position, is prevented or requires increased handling force.

8. The spacer nut as claimed in claim 7, characterized in that the securing position/s is/are provided at the end and/or at the beginning of the unscrewing path of the spacer piece (17).

9. The spacer nut as claimed in claim 7, characterized in that the thread-securing means comprises a stop element (35) which abuts against a stop (30, 37).

10. The spacer nut as claimed in claim 9, characterized in that the stop element (35) is arranged on the spacer piece (17) and the stop (30, 37) is arranged on the intermediate piece (3) or on the threaded part (1).

11. The spacer nut as claimed in claim 9, characterized in that the stop element (35) and/or the stop (37) are/is formed such that, for a release of the thread-securing means, said stop element and/or stop are/is deformed by an increased handling force.

12. The spacer nut as claimed in claim 1, wherein the spacer piece has a threaded portion, which comprises the thread of the spacer piece, and a head portion, which comprises the contact surface of the spacer piece, wherein the head portion has larger cross-sectional dimension than the threaded portion.

13. A spacer nut assembly for connecting spaced-apart fastening portions of two components, comprising:
   a threaded part forming an internal thread for receiving a screw;
   an intermediate piece forming a thread and a through-passage opening;
   wherein the threaded part and the intermediate piece are connected to one another such that an accommodating space for a fastening portion of a first component is formed between the threaded part and the intermediate part, and the internal thread and the through-passage opening in the intermediate piece are arranged in alignment;
   a spacer piece with a thread that can be screwed together with the thread of the intermediate piece, and having a through-passage opening that is in alignment with the internal thread, and a contact surface that incorporates one end of the through-passage opening of the spacer piece and is provided for abutment against the fastening portion of the second component;
   wherein the threaded part and the intermediate piece are connected to one another by a clamp, which is provided for engaging around the fastening portion of the first component, wherein the clamp includes a first clamp leg and a second clamp leg that are spaced apart to form the accommodating space, wherein the first clamp leg and the second clamp leg are interconnected by a closed clamp end;
   wherein the intermediate piece is connected to the first clamp leg and the threaded part is connected to the second clamp leg;
   wherein the intermediate piece is rotatable relative to the first clamp leg about an axis which is oriented perpendicularly to a longitudinal axis of the through-passage opening of the intermediate piece.

14. The spacer nut assembly as claimed in claim 13, wherein the through-passage opening of the spacer piece has a clamping portion with a cross section dimensioned such that a screw, which is provided for screwing into the internal thread of the threaded part, carries along the spacer piece with a clamping action during such a screwing-in operation.

15. The spacer nut assembly as claimed in claim 14 wherein at least the clamping portion is formed from a different material than a main body of the spacer piece.

16. The spacer nut assembly as claimed in claim 13 wherein the internal thread of the threaded part and the thread of the spacer piece are oriented such that, when as the screw is rotated in the through-passage opening of the spacer piece the spacer piece unscrews from the intermediate piece.

17. The spacer nut assembly of claim 13, further comprising:
   a detent lug, which extends from the spacer piece down along an outer side of the intermediate piece, and a stop arranged on the intermediate piece and that is engaged by the detent lug when the spacer piece has been unscrewed substantially all the way out of the intermediate piece in order to prevent further unscrewing of the spacer piece so as to prevent the spacer piece from being unscrewed all the way out of the intermediate piece.

18. The spacer nut assembly of claim 17, wherein the accommodating space has an open introduction end with a first height, and the accommodating space has at least one other portion, toward the closed clamp end, having a second height that is greater than the first height.

19. A spacer nut assembly for connecting spaced-apart fastening portions of two components, comprising:
   a threaded part forming an internal thread for receiving a screw;
   an intermediate piece forming a thread and a through-passage opening;
   wherein the threaded part and the intermediate piece are connected to one another such that an accommodating space for a fastening portion of a first component is formed between the threaded part and the intermediate part, and the internal thread and the through-passage opening in the intermediate piece are arranged in alignment;
   a spacer piece with a thread that can be screwed together with the thread of the intermediate piece, and having a through-passage opening that is in alignment with the internal thread, and a contact surface that incorporates one end of the through-passage opening of the spacer piece and is provided for abutment against the fastening portion of the second component; and
   a thread-securing means that engages when the spacer piece has been unscrewed substantially all the way out of the intermediate piece in order to prevent further unscrewing of the spacer piece so as to prevent the spacer piece from being unscrewed all the way out of the intermediate piece.

20. The spacer nut assembly of claim 19, wherein the thread securing means is formed by a detent lug, which extends from the spacer piece down along an outer side of the intermediate piece, and a stop arranged on the intermediate piece and that is engaged by the detent lug when the spacer piece has been unscrewed substantially all the way out of the intermediate piece.

* * * * *